United States Patent [19]
Sargent

[11] 3,990,467
[45] Nov. 9, 1976

[54] COMBINED VALVE STEM AND PRESSURE GAUGE

[75] Inventor: Neal L. Sargent, Garden Grove, Calif.

[73] Assignee: Norman St. Jean, Midway City, Calif.

[22] Filed: Jan. 16, 1976

[21] Appl. No.: 649,830

[52] U.S. Cl. ............................... 137/227; 73/146.8
[51] Int. Cl.² ......................................... F16K 15/20
[58] Field of Search ........... 137/227, 228; 73/146.8; 116/34

[56] References Cited
UNITED STATES PATENTS

| | | | |
|---|---|---|---|
| 1,423,447 | 7/1922 | Noe | 137/227 X |
| 3,670,688 | 6/1972 | Seaberg | 137/227 X |
| 3,906,988 | 9/1975 | Mottram | 137/227 |

*Primary Examiner*—Harold W. Weakley
*Attorney, Agent, or Firm*—William C. Babcock

[57] ABSTRACT

A combined valve stem and pressure gauge that is permanently supported relative to the rim of a pneumatic tired vehicle to indicate by color at all times whether the air pressure in the tire is at a recommended level, or whether the tire is under inflated or over inflated. The invention permits air under pressure to be introduced into the tire to inflate the latter to the recommended level.

1 Claim, 5 Drawing Figures

COMBINED VALVE STEM AND PRESSURE GAUGE

BACKGROUND OF THE INVENTION

1. Field of the Invention

Combined valve stem and pressure gauge.

2. Description of the Prior Art

A major object of the present invention is to provide a combined valve stem and pressure gauge that permits air under pressure to be introduced into the tire as required, with the valve stem preferably removably supporting a cap on the free outer end thereof, and the invention when the cap is either in place on the stem or removed therefrom visually indicating by color whether the air pressure in the tire is at a recommended level, or whether the tire is under inflated or over inflated.

Another object of the invention is to supply a combined valve stem and pressure gauge that is simple and easy to mount on the rim of a vehicle, has simple mechanical structure, can be fabricated from standard commercially available materials, and is sufficiently inexpensive as to encourage the widespread use thereof.

A further object of the invention is to furnish valve stems and pressure gauges that are particularly useful on dual pneumatic tired wheel assemblies to assure that each tire is inflated to a recommended pressure to assure equal distribution of the load of the vehicle between the dual tires.

Yet another object of the invention is to assure, by visual inspection only, that all tires on a vehicle are inflated to a recommended level, and by so doing obtaining maximum mileage from the tires at a minimum cost.

SUMMARY OF THE INVENTION

The combined valve stem and pressure gauge includes a tubular rubber jacket that has first and second end portions. The first end portion is so shaped as to sealingly engage an opening in the rim of a vehicle on which a pneumatic tire is mounted or if desired may be secured to an inner tube when the latter is used. A transparent tube is permanently disposed in the jacket, with a first end of the tube serving to hold an apertured end cap in a fixed position in the jacket. A substantial portion of the transparent tube projects outwardly from the jacket, with this portion terminating in a second ring shaped end.

An air inlet tube is longitudinally disposed in the transparent tube. The air inlet tube has a first end portion that extends through the apertured end cap and defines an annulus shaped space therewith. The second end portion of the air inlet tube includes a flange and an externally and internally threaded shell, which second end portion is outwardly disposed from the second end of the transparent tube. The shell has a conventional air inlet valve threaded into the interior thereof.

The exterior threaded surface of the shell has an opaque internally threaded sleeve mounted thereon that holds the flange in abutting contact with the second end of the transparent tube. The portion of the transparent tube between the second end of the tubular jacket and the adjacent end of the sleeve provides a window through which the colors of the pressure indicating member of the invention is visible.

The pressure indicating member includes a central tube that on a first end develops into a head of enlarged transverse cross section. The central tube is slidably mounted on the air inlet tube. First and second elongate, concentric, resilient sleeves that are radially spaced from one another extend towards the end cap. The free end of the first sleeve is secured to the end cap, and the free end of the second sleeve to the air inlet tube.

The first and second sleeves and head cooperate to define an air chamber into which air can flow from the tire through an annulus space in the end cap defined in the aperture through which the air tube extends. A helically wound precision spring encircles the first sleeve. The spring has a first end anchored to the end cap and a second end to the head.

The second end of the tube develops into an elongate, cup shaped, cylindrical body that has a central band of yellow on the exterior thereof that is of the same width as the window. First and second bands of red are situated on opposite sides of the yellow band. An internally threaded cap is provided that engages external threads on the shell that are outwardly disposed from the sleeve.

The tire is inflated in a conventional manner by use of the air inlet valve and air inlet tube. Pressurized air from the tire flows through the annulus into the air chamber to force the pressure indicating member longitudinally away from the end cap. The helical spring tends to restrain such longitudinal movement.

As air flows into the confined space the helical spring is tensioned to allow movement of the pressure indicating member. When the yellow band is transversely aligned with the window, the tire is inflated to a recommended pressure. This recommended pressure is the pressure at which the manufacturer of the tire considers best for optimum mileage. If the tire is over inflated a portion of the first red band will show in the window as well as a part of the yellow band. Likewise, if the tire is under inflated all or a part of the second red band will show in the window.

DESCRIPTION OF THE PREFERRED EMBODIMENT

Figure 1:
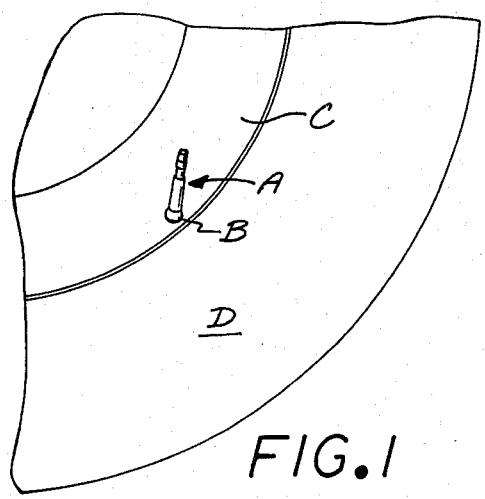
FIG. 1 is a perspective view of the combined tubeless valve stem and pressure gauge invention mounted on the rim of a pneumatic tired wheel.
Figure 3:
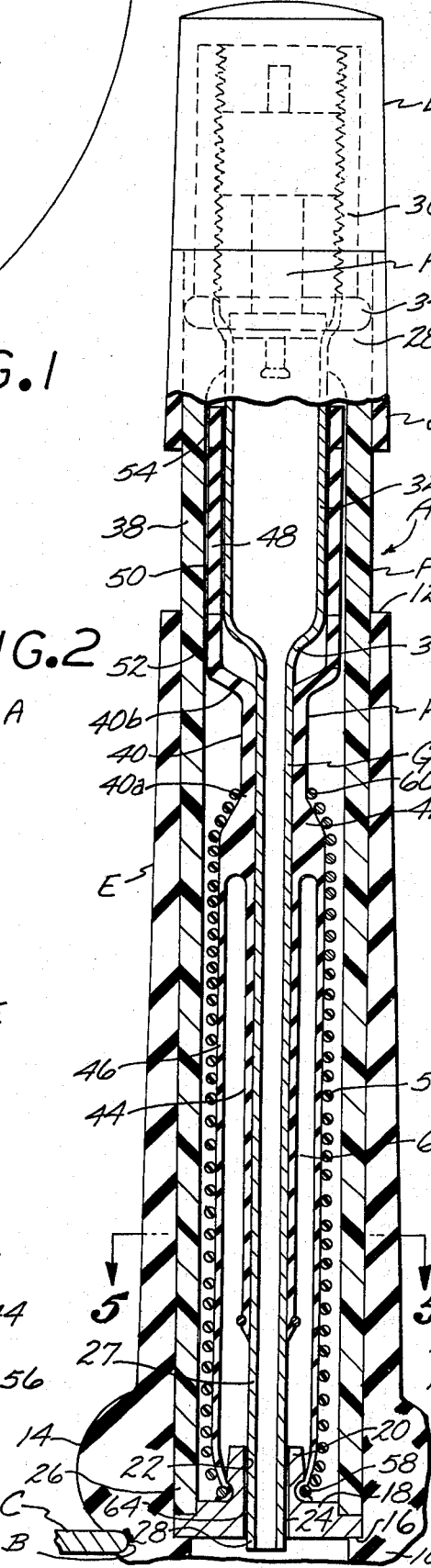
FIG. 3 is a first longitudinal cross sectional view of the invention, with the color indicating portion thereof disposed to visually show that the tire is inflated to the recommended pressure.
Figure 4:
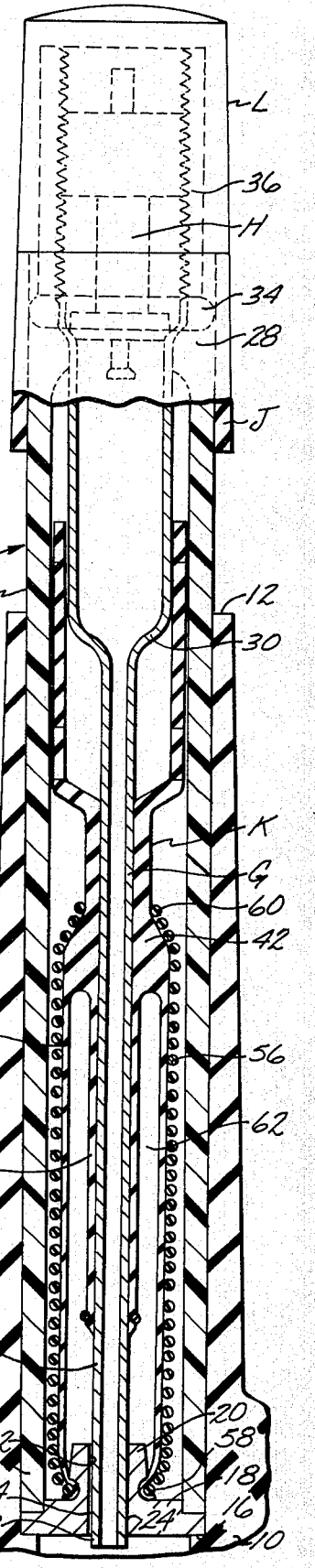
FIG. 4 is a second longitudinal cross sectional view of the invention, with the color indicating portion thereof disposed to visually show that the tire is under inflated.

The invention A as may best be seen in FIGS. 1 and 3 is permanently mounted on an automotive rim C by engaging an opening B in the latter and when so mounted visually indicates by color whether the air in a tire D mounted on the rim is at the manufacturer's recommended pressure or over or under inflated.

Figure 2:
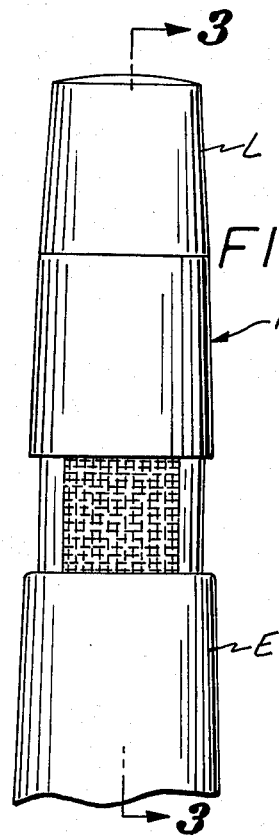
FIG. 2 is a side elevational view of the invention.
Figure 5:
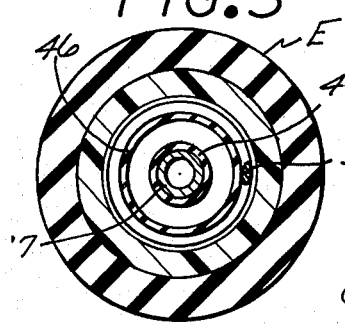
FIG. 5 is a transverse cross-sectional view of the invention taken on the line 5—5 of FIG. 3.

The invention A, as best seen in FIGS. 2 and 3, includes an opaque tubular jacket E that has first and second ends 10 and 12. The jacket E adjacent the first end develops into a grooved bead 14 that engages the opening B. Jacket E has an internal body shoulder 16 adjacent the first end 10 thereof.

An end cap 18 is provided that seats on the body shoulder 16. The cap 18 includes a neck 20 through which a longitudinal aperture 22 extends. The neck 20 has an external circumferential groove 24 defined thereon.

A transparent tube F is provided that has first and second ends 26 and 28, with the first end 26 being in abutting contact with the end cap 18.

An air inlet member G is longitudinally disposed within the tube F. The air inlet member includes a first elongate tube 26 that has first and second ends 28 and 30. The second end 30 develops into a second axially aligned tube 32. The second tube 32 on the end most remote from the first tube 26 develops into a flange 34 from which an externally and internally threaded cylindrical shell 36 projects. A spring-loaded externally threaded air inlet valve H of conventional present day design is disposed in shell 36 and in engagement with the internal threads therein.

An opaque cylindrical shell J is secured to the second end 28 of the transparent tube F and longitudinally spaced from the second end 12 of jacket E to provide a cylindrical window 38 in the transparent tube F.

A pressure indicating member K is longitudinally disposed in the transparent tube F. The pressure indicating member K includes a third tube 40 that is slidably movable on the first tube 26. The third tube F has first and second ends 40a and 40b. The first end 40a develops into a head 42 from which first and second concentric resilient side walls 44 and 46 extend. The second end 40b develops into an elongate cylindrical body 48 that has a circumferential yellow band 50 defined thereon that is the same width as the length of the window F. First and second red bands 52 and 54 are defined on body 48 on opposite sides of red band 50.

The free end of the first and second side wall 44 and 46 are secured to the end cap 18 and first tube 26, as may best be seen in FIG. 3. An elongate compressed helical spring 56 encircles the second side wall 54 and has a first end 58 in engagement with groove 24. The first end 58 grips the free end of second side wall 46 to secure the same to end cap 18. A second end 60 of the spring 56 is in engagement with the head 42.

The first and second side walls 44 and 46 are resilient and may stretch longitudinally. The first and second side walls 44 and 46 cooperate to define a confined space 62 therebetween that is in communication with an annulus space 64. The first tube 26 is of smaller transverse cross section than the aperture 22 and cooperates to define the annulus space 64 therewith.

The valve H permits pressurized air to flow into the interior of the tire D through the first tube 26. The spring 56 at all times tends to prevent the pressure indicating member K moving longitudinally away from the rim C. However, when air flows into the confined space 62 through annulus 64, the spring 56 is deformed longitudinally and the pressure indicating member K moves longitudinally relative to the window 38. The spring is calibrated and is of such strength that when air in the confined space 62 has reached the recommended pressure set by the manufacturer for inflation of the tire D, the body 38 is so disposed that the yellow band 50 thereon is transversely aligned with the window 38. It will be apparent, as viewed in FIG. 3, that if the tire D has excessive air pressure therein the pressure indicating member K will move upwardly to the extend that at least a portion of the red band 52 is visible through the window 38.

Likewise, if the tire is underinflated, the spring 56 will contract and move the pressure indicating member K downwardly as viewed in FIG. 3 to the extent that at least a portion of the second red band is visible. The invention A is illustrated as having an internally threaded cap L mounted on the externally threaded portion of the shell 36 that projects outwardly beyond the sleeve J.

The use and operation of the invention has been described previously in detail and need not be repeated.

I claim:
1. A combined valve stem and pressure gauge device that extends through an opening in an automotive rim that has a tire mounted thereon to communicate with the interior of said tire, said device capable of permitting air under pressure to be discharged into or out of said tire, with said device visually indicating by color whether said tire is inflated to a recommended pressure or over or under inflated, said device including:
   a. an opaque, tubular jacket that has first and second ends and an interior body shoulder adjacent said first end;
   b. first means on said first end of said jacket for holding said jacket in communication with the interior of said tire on said rim;
   c. an end cap seated on said body shoulder in said tubular jacket, said end cap having an aperture extending therethrough;
   d. a transparent tube longitudinally disposed in said tubular jacket and secured thereto, said transparent tube having first and second ends, said first end in abutting contact with said end cap to hold the latter on said body shoulder, and said second end of said transparent tube outwardly disposed from said second end of said tubular jacket a substantial distance therefrom;
   e. an air inlet member that includes a first elongate tube that has a first end and a second end, said second end developing into a second axially aligned tube of substantially greater diameter than said first tube, said second tube on the end thereof most remote from said first tube developing into a flange from which an internally and externally threaded shell projects, said first and second tubes disposed within said transparent tube, said first tube extending through said aperture and cooperating to define an annulus space therewith, said flange in abutting contact with said second end of said transparent tube;
   f. a spring-loaded externally threaded air inlet valve disposed in said shell and in engagement with said internal threads therein;
   g. an opaque sleeve secured to said second end of said transparent tube and longitudinally spaced from said second end of said tubular jacket, said sleeve and tubular jacket cooperating with said transparent tube to define a cylindrical window;
   h. a pressure indicating member that includes a third tube slidably mounted on said first tube, said third tube having first and second ends, said first end of said third tube developing into a head, said second end of said third tube developing into a cylindrical body that has a band of yellow thereon that is the same width as the length of said window, and first and second bands of red on opposite sides of said yellow band, and said head having first and second elongate concentric sidewalls of a resilient material extending therefrom;
i. second and third means for securing the free ends of said first and second sidewalls to said first tube and to said inlet cap to define a confined space between said first and second side walls that is in communication with said annulus, said confined space at all times in communication with pressurized air in said tire; and
j. a compressed helical spring that has first and second ends, said helical spring enveloping said first side wall, said first spring having said first end secured to said end cap and said second end to said cap, said spring at all times tending to prevent said pressure indicating member moving away from said end cap, and said spring so calibrated as to longitudinally deform to the extent that said pressure indicating member moves longitudinally in said transparent tube to dispose said yellow band in transverse alignment with said window when said air in said confined space is at said recommended pressure, with at least a portion of said first red band showing in said window when said tire is over inflated, and at least a portion of said second red band showing in said window when said tire is under inflated.

* * * * *